United States Patent [19]

Spoor

[11] 4,217,785
[45] Aug. 19, 1980

[54] ERASABLE-FOIL-RESISTANCE COMPENSATION OF STRAIN GAGE TRANSDUCERS

[75] Inventor: Martin Spoor, Cambridge, Mass.

[73] Assignee: Bofors America, Inc., Edison, N.J.

[21] Appl. No.: 1,698

[22] Filed: Jan. 8, 1979

[51] Int. Cl.³ .............................................. G01B 7/20
[52] U.S. Cl. ...................................... 73/766; 73/1 B
[58] Field of Search ...................... 73/766, 1 B, 765; 29/610 SG, 625; 338/3, 7; 174/68.5

[56] References Cited

U.S. PATENT DOCUMENTS

| | | | |
|---|---|---|---|
| 3,230,612 | 1/1966 | Potter et al. | 174/68.5 X |
| 3,302,067 | 1/1967 | Jackson et al. | 174/68.5 X |
| 3,447,362 | 6/1969 | Pien | 73/766 |
| 3,959,876 | 6/1976 | Jouanneault | 29/625 X |

Primary Examiner—Jerry W. Myracle
Attorney, Agent, or Firm—James E. Mrose

[57] ABSTRACT

A strain-gage transducer incorporating a plurality of electrical-resistance strain gages coupled together in a bridge network is caused to remain zero-balanced under varying-temperature conditions by way of dual-resistance foil-type unit interposed at one of the output corners of the bridge with its two like foil-resistance elements occupying adjacent arms. The foil material is selected to exhibit a resistance change with temperature representing a factor which enables a target room-temperature measurement to be calculated once a rate of change of bridge output with temperature has been determined from measurements taken while the unstrained transducer is held at different temperatures. Relatively broad surfaces of the foil elements are left exposed, and the unit of which they are a part is so disposed in relation to the transducer structure that the exposed foil is accessible for controlled erasure-type abrasion which will bring about the target measurement and attendant compensation.

12 Claims, 7 Drawing Figures

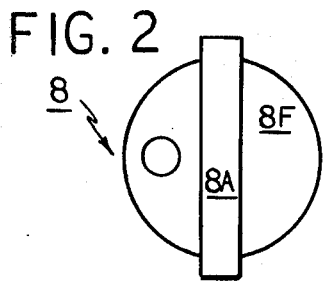
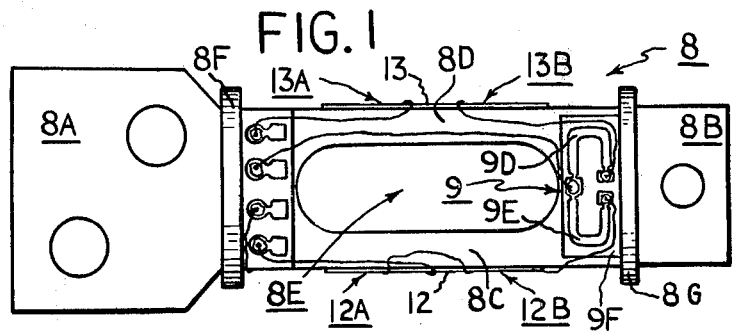
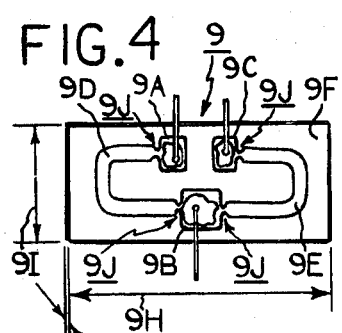
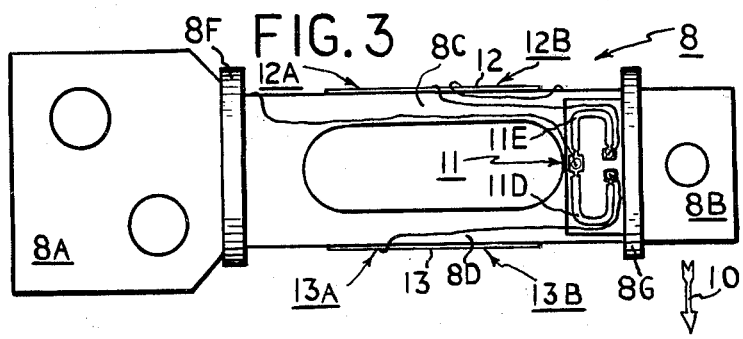
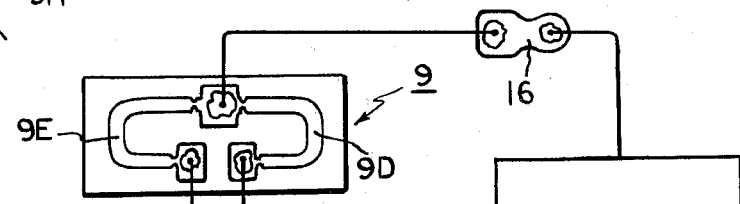
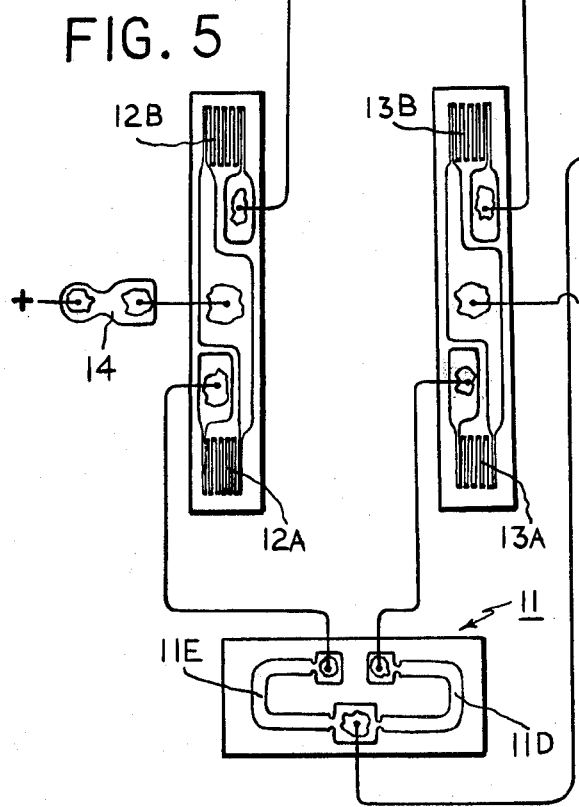
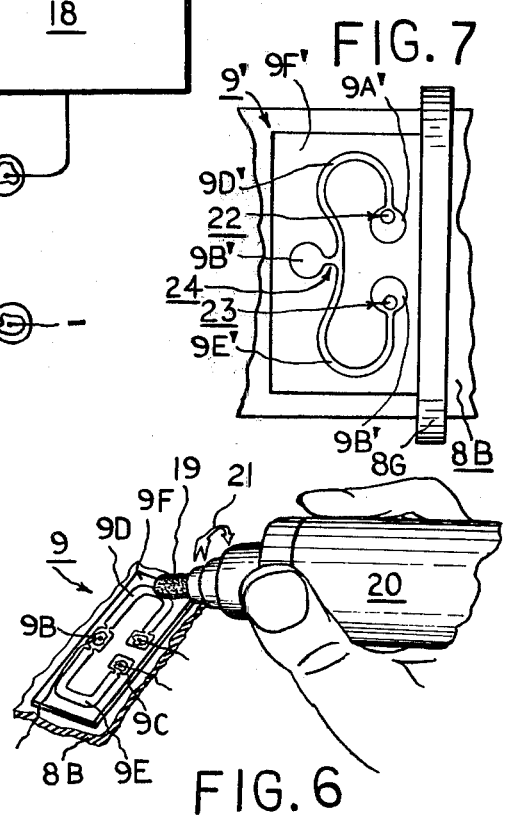

ERASABLE-FOIL-RESISTANCE COMPENSATION OF STRAIN GAGE TRANSDUCERS

BACKGROUND OF THE INVENTION

The present invention relates to improvements in precision strain-gage transducers which may be readily compensated for temperature effects upon zero-balancing, and, in one particular aspect, to high-performance transducers, such as miniature load beams, wherein temperature-induced instability of zero balance of strain-gage networks is uniquely and advantageously counteracted by way of resistance units readily abradable to adjust internal network resistances at room temperature and effect compensation in accordance with results of predetermined measurements at different temperatures and of related computations based upon both the measurement data and a factor associated with the resistance material.

Accurate measurements characterizing such phenomena as force, torque, weight and pressure are often performed through the instrumentality of so-called strain-gage transducers, wherein electrical-resistance strain gages respond to elastic deformations of sensing elements undergoing loading. Such transducers have become well known in a variety of sizes and forms, and they can be expected to yield measurements with most remarkable exactness even under extremely severe operating conditions when constructed and compensated with great care. Among the numerous causes of possible error which can afflict precision transducers, some of the most vexing are associated with adverse effects of temperature changes. Virtually every portion of a transducer sensing element and its gages and its wiring systems can respond to thermal variations in some way tending to degrade resultant measurements, and it has therefore become common practice for manufacturers of such assemblies to incorporate temperature-compensation provisions into them. The compensation techniques and practices may vary, depending upon the nature and extent of thermal problems encountered in a particular situation, as well as the time and expense which can be justified in achieving desired degrees of improvement.

When properly excited and coupled to impress its output upon a display or control stage, a strain-gage transducer in the unloaded condition might always be expected to signal a related zero output, and simple adjustable balancing resistances in adjacent arms of its strain-gage bridge network may in fact suffice transiently to trim the network to that zero-output condition when the temperature remains fixed. However, temperature excursions no greater than those likely to be encountered in many applications will most often have the highly undesirable effect of upsetting the pre-adjusted zero-balance, and consequently the accuracy of any measurements made without accounting for the imbalance. Repeated temperature re-cycling of the transducer, along with repeated bridge re-balancings, may well add significant manufacturing costs and difficulties without altogether eliminating the possibility of further unbalancing due to subsequent temperature changes, and, further, one cannot expect that zero-balance resistors built into transducers will be accessible for periodic adjustments by the user because such devices are commonly both remotely located and permanently hermetically sealed. It has been known previously to calculate the amount of temperature-compensating resistance which should be introduced in an arm of a transducer bridge circuit to achieve a desired balance, and to select and solder into place in an appropriate arm a small "charted" or predetermined length of temperature-sensitive wire which would provide that resistance, but exact lengths were often difficult to maintain effectively, due to such factors as the shunting effects of solder, and the attendant manual labor and skills involved were negative factors also.

In accordance with teachings and related practices of the present invention, zero-balance resistances which are in some respects counterparts of prior balance resistances are also utilized, but permanent temperature compensation for zero balance purposes is brought about with the aid of further adjustable resistances which have known temperature dependencies and which are included in both of two adjacent arms of a bridge circuit as exposed foil elements accessible for critical adjustment by abrasion. By way of calculations based in part upon measurements obtained while the unloaded transducer is maintained at different temperatures, and by way of control measurements performed automatically or by an operator while one of the temperature-sensitive foil elements undergoes abrasion, the unsealed strain-gage transducer may be accurately temperature-compensated for a zero-balancing which will hold for subsequent operations of the finished product within a useful range of temperatures.

Among prior U.S. patents which deal with various aspects of thermal compensation in respect of strain gage transducers are U.S. Pat. Nos. 2,801,388 and 3,178,938.

SUMMARY OF THE INVENTION

In one preferred expression of the present invention, a miniature load-beam type of transducer, having four strain gages associated two each with flexure portions of two parallel beams forming a parallelogram-type sensing element, is also provided with a pair of bridge-balance resistance elements and a pair of temperature-compensation resistance elements, the two pairs of resistance elements being connected into adjacent arms of a bridge network formed by the strain gages, respectively at opposite "corners" where they can be effective to influence bridge zero-balance conditions. Both pairs of resistance elements are fashioned of foil materials, one of which has a predetermined temperature dependency to promote efficacy of the temperature-compensation elements, and are formed as flat units each atop a separate insulating carrier. The foil strands which make up the low-resistance elements remain exposed, and the two units are mounted adjacent the transducer where they will not interfere with the strain-sensing functions and where the exposed foil strands may be conveniently engaged and abraded by appropriate material-removal tooling. In its wired condition, but before any final sealing can interfere with intended abrasive adjustments of its resistance unit, the transducer has its bridge network excited by a reliable electrical power source and coupled to a suitable output device which will yield accurate electrical measurements characterizing even small bridge-unbalance conditions. The bridge zero-balance condition is initially measured by the output device at room temperature, and the transducer is next raised to a relatively high temperature and its voltage unbalance due to all temperature effects is then measured. The difference in output measurements, divided by the number of degrees of temperature change, represents a rate of change in zero balance with temperature, and that rate is multiplied by a factor which is equal to the reciprocal of the percentage change in resistance of the material of the temperature-compensation resistances to achieve the desired zero-balance compensation. Depending upon whether the target measurement is to be positive or negative, one or the other of the pair of foil temperature-compensation resistances is to be increased in resistance by abrading it, the sense being determined readily by shorting one or the other and thereby establishing which element will cause the measured output to change to the target value when increased in resistance. Motor-driven erasers afford a convenient and readily-controllable means for abrading the elements and changing their resistances. Once the target measurement is established, the bridge can be rebalanced following standard procedures in which the bridge-balance resistance elements are adjusted in value to achieve a zero balance for the transducer.

Accordingly, it is one of the objects of the present invention to promote convenient and effective compensation for effects of temperature changes on zero balance of strain-gage transducers, by way of foil-type compensation resistance elements which are fashioned and disposed for compensating resistance adjustments by mechanical abrasion.

A further object is to provide foil-type temperature-compensation resistance units which lend themselves to fine adjustment by erasure-type abrasion and which will correct zero-balance of strain-gage transducers in accordance with a unique proccessing wherein abrasive adjustments are performed to urge bridge outputs to target values based upon prior empirical determinations of rate of change in zero balance for the transducers involved and based further upon a factor characterizing temperature dependency of the foil material used in the compensating units.

Still further, it is an object to provide new and improved adjustable foil-resistance compensation units to which soldering of connections may be effected without inadvertently altering resistance of sensitive portions thereof.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a view, from its left side, and inverted, of a miniature load-beam type of strain gage transducer element, less a protective cover, carrying an erasable-foil bridge-balancing resistance unit;

FIG. 2 is an end view of the same element, from the left as shown in FIG. 1;

FIG. 3 illustrates the right side of the transducer element of FIGS. 1 and 2, together with a symbol characterizing intended orientation of loading forces;

FIG. 4 depicts, in enlargement, an erasable-foil temperature-compensation resistance unit useful in practice of this invention;

FIG. 5 provides a partly pictorial circuit diagram for an electrical bridge incorporating strain gages and erasable foil resistances such as those associated with the transducer element of FIGS. 1–3;

FIG. 6 represents the abrading via a motorized eraser of a temperature-compensation resistance unit in accordance with the present teachings; and FIG. 7 illustrates, in enlargement, a fragment of the load beam of FIGS. 1–3 together with an improved form of erasable-foil compensation resistance.

DETAILED DESCRIPTION OF THE PREFERRED EMBODIMENTS

Having reference to the drawings, wherein like reference characters designate identical or corresponding components and units throughout the several view, and more particularly to FIGS. 1 through 3 thereof, a strain-gage transducer, 8, which may be compensated for effects of temperature changes upon its zero-balance readings in accordance with these teachings, is equipped with a special foil-type resistance unit, 9, serving that purpose. The transducer element is fashioned from a flat metallic member, with rigid end portions 8A and 8B interconnecting its parallel relatively-flexible upper and lower beams, 8C and 8D, respectively, to form a parallelogram-type array which has basic design features in common with those disclosed in U.S. Pat. No. 2,866,059. In addition to the relatively large transverse opening, 8E, which separates the mid-portion of the element into the two beams, there are smaller openings through the end portions 8A and 8B accommodating mounting bolts and a force-applying link, respectively. Arrow 10 (FIG. 3) characterizes the intended direction and relative location of the loading forces which a linkage would apply to the beam end 8B while its opposite end 8A is held relatively fixed, although for purposes of the compensation under discussion the element is left unloaded and unstrained insofar as possible. In the latter connection, it is also required that the compensation resistance unit 9, and a companion bridge-balance resistance unit 11, be physically accessible for resistance adjustments by mechanical abrasion, and any final sealing which would block such accessibility is therefore deferred until the zero-balance temperature compensation is established. It is on that account that the transducer assemble of FIGS. 1–3 is portrayed without the hermetic-sealing bellows which will later connect with and span the two spaced circular collars 8F and 8G and protectively enclose the transducer strain gages as well as the resistance units 9 and 11. Gaging for the parallel beams 8C and 8D is in this instance disposed along the top-and bottom-most surfaces of the sensing mid portion of the transducer, where the top dual-gage strip 12 includes at one end a tension-characterizing foil gage 12A and at the other end a compression-characterizing gage 12B, and where the like bottom strip 13 includes a compression-characterizing foil gage 13A and a tension-characterizing gage 13B.

The pictorial-and block-diagrammed wiring arrangement appearing in FIG. 5 characterizes a Wheatstone-bridge network in which both the two sets of dual strain gages 12A–12B and 13A–13B and the two balance-resistance units 9 and 11 are disposed within its four arms. With reliably stable electrical excitation applied across the input terminals 14 and 15 wired respectively with the junctions of strain gages 12A–12B and 13A–13B, the bridge should give evidence of electrical unbalance conditions across its output terminals 16 and 17 only in response to loading of the transducer. However, a sensitive electrical signal detector, 18, which may be in the known form of a digital voltmeter in some practices or in the form of an input stage to automatic calculating and control equipment in other practices, will tend to be falsely supplied with bridge output signals which instead reflect the troublesome zero-balance type of variations with temperature which have been referred to hereinabove. It is with the object of effecting compensation for those variations that resistance unit 9 is included within the bridge, in two of the arms adjacent one of the output "corners", namely that associated with output terminal 16 in the network under consideration. Bridge-balance resistance unit 11, which is not temperature-dependent, and which is included only to bring about a collateral conventional type of zero-balancing, is similarly disposed at the opposite output "corner", near output terminal 17.

The physical construction of compensation unit 9 is important to the success not only of the temperature compensation itself but also of a precision transducer-manufacturing operation which can be implemented economically and either without unusual operator skills or by way of automation. It is a foil unit (FIG. 4) having three relatively large- or broad-area wiring tabs, 9A, 9B and 9C, and two relatively low-resistance strands or half-loops, 9D and 9E, all of which are part of one layer and lie in one plane atop an insulating carrier, 9F, and are integral with one another. The rectangular carrier need only be of a paper-like thickness, 9G, and may in fact comprise a plastic-impregnated paper material, or the like, and may typically have a length, 9H, of about 7/16 inch and a width, 9I, of about 0.187 inch. Metals preferred for the foil layer are those with a relatively high temperature coefficient of resistance, such as nickel, copper, and a stable nickel-iron alloy known commercially as Balco. For example, the percentage change of resistance (increase), over a 100° F. range, is about 30% in the case of nickel, and about 20% for copper, and about 27% for Balco. Conventional printing and acid-etch and like foil-gage and printed-circuit manufacturing techniques may be used to produce the desired pattern wherein the thin but relatively wide strands 9D and 9E are elongated and looped broadly outwardly from the clustered wiring tabs 9A, 9B and 9C, on opposite sides, as shown in FIG. 4. Both half-loops or strands are joined directly with a common tab, 9B, and, in each instance, the integral connections between a strand and it wiring tabs is narrowed or necked-down to form a constriction beyond which molten solder from the wiring tabs will not tend to flow. The four constrictions, 9J, are narrow enough to hold the molten solder at those sites, by what evidence themselves as surface-tension effects akin to those of capillary action, and yet the constrictions do not themselves unduly increase the as-formed low resistance (example: one-half ohm) which the half-loops 9D and 9E offer between the tabs which they span. Unless the molten solder is blocked in that way, it may spread from the tabs while wiring is being connected, with the result that one or both resistance loops may become partially shunted lengthwise by the solder of very low resistance, and the desired predetermined resistance and temperature-dependency may be altered enough to impair the intended compensation adjustments.

When a transducer like that of FIGS. 1-3 is fully wired into a network like that of FIG. 5, its output device 18 is used to characterize its zero-balance signalling at a first relatively low temperature, i.e., while no loads are being experienced. A room-temperature zero-balance signalling is obtained, if the first temperature is not room temperature. The unstrained transducer is then raised to a second relatively high temperature, at which another zero-balance signalling is characterized by the output device, and a rate-of-change of zero-balance is established by the ratio of the difference in the two characterizations to the difference between the first and second temperatures. In the case of unbalance-voltage indications by device 18, for example, its two characterizations of voltage yield a simple difference voltage value, which leads to a ratio which reduces to a voltage change per degree, specifically voltage per degree Fahrenheit in a preferred context. From that ratio, a product is obtained with a factor which is the reciprocal of the aforementioned percentage change of resistance which is characteristic of the material of which the foil is made, namely 3.33 for nickel (1/0.30), 5 for copper (1/0.20), and 3.8 for Balco (1/0.27). That product represents a signalling value, as sensed by device 18, which is next subtracted from a zero-balance signalling which had been realized at room temperature, to result in a "target" zero-balance signalling which should be achieved by adjustment of resistance in unit 9 in order to effect the desired temperature compensation. Numerical readings related to such signalling, such as voltage readings, may be observed by an operator, for example, and the adjustment of resistance is then made without specifically determining what the resistance values in unit 9 are, but, instead, by observing the numerical output readings and making the adjustment progressively until the "target" reading is registered by device 18. Although direct numerical indications, and simple calculations, may be observed and made readily, the processing may be accelerated and rendered less costly and demanding of skill by having the measurements and computations performed automatically, either in whole or in part.

FIG. 6 illustrates the use of an eraser-type abrasive member 19, rotated in the chuck of a small motor 20, to adjust resistance in the temperature-compensation unit 9 in furtherance of the aforesaid compensation procedures. While the member 19 is being rotated, as suggested by arrow 21, it is brought into abrading engagement separately with the foil loop 9D and/or 9E, as required, to reduce the thickness of the foil there and thereby raise the effective resistance and change the reading of device 18 to the "target" reading, at room temperature. Before abrading is commenced, the one of half-loops 9D and 9E which should be raised in resistance to drive the reading to the "target" value is conveniently established by shunting or shorting tabs 9A and 9B, or 9B and 9C, and determining whether the change in reading is in direction toward or away from the "target" value. If the change is in a direction which would enable the "target" value to be reached, then the half-loop opposite that which was shorted should be abraded and raised in resistance until the "target" reading obtains; otherwise, that same half-loop should be so abraded. Reasonable amounts of "overshoot" of the "target" reading, caused by excessive abrasion of the foil in one half-loop, can be readily corrected by abrading the other until the desired reading returns. The abrasive eraser 19 is preferably large enough to engage a large area of any half-loop such as 9D or 9E, rather than just a small spot which might then be completely worn through by too-vigorous abrading. Any surface film remaining on the exposed foil half-loops is removed by the initial abrading, and the rate of change of zero-balance readings tends to increase sharply once such film is removed. Heat generated by the abrading is to be avoided, and it is therefore advisable to abrade in steps, stopping every so often to permit such heat to dissipate and/or to apply a fluid cleaner or coolant.

Once the "target" output is reached, signifying completion of the zero-balance temperature-compensation measures, the transducer bridge network is preferably rebalanced so there is no zero-loading output. That may be accomplished with the aid of bridge-balance resistance elements 11D and 11E of unit 11 (FIG. 5), those elements preferably being of the same foil configuration as the elements of compensation unit 9 but being made of a foil material, such as constantan (about 60% copper and 40% nickel), which has negligible resistance change with temperature over a commonly-expected range of temperatures. They may also have somewhat greater resistance, such as about three times the resistance of elements 9D and 9E. Erasure-type abrasion, like that described hereinabove, may be empolyed to increase resistance of one of the elements 11D and 11E in relation to that of the other, and thereby cause the output of the bridge network to become balanced to substantially zero while the transducer remains unstrained.

An alternative useful configuration of foil unit, 9', is represented in FIG. 7, together with a fragment of the rigid end portion 8B of the same transducer, 8. The unit construction is generally like that of temperature-compensation unit 9, and like reference characters, distinguished by single-prime accents, are therefore used to designate the same or like parts. As in the case of unit 9, the carrier, 9F', is mounted in relation to transducer rigid end portion 8B, as by direct bonding thereto, such that it maintains the same temperature as the nearby strain gages and deformable sensing portions of the transducer body. However, the two half-loop elements 9D' and 9E' are substantially semicircular and lack corners, which is more conducive to trouble-free abrasion by cylindrical eraser-type tools having substantially flat circular ends conveniently moved into and out of abutting abrading engagements along paths of movement perpendicular to the flat carrier 9F' and the planar foil elements 9D' and 9E'. Moreover, the problem of unwanted molten solder flow along the half-loop elements from wiring end tabs 9A' and 9B' is resolved by providing small openings, 22 and 23, within them at locations where the half-loops merge or join integrally with those tabs, the openings serving to separate the junctures into two spaced parallel paths each so narrow as to have surface-tension effects which will block the flow of solder significantly beyond them. The openings 22 and 23 are of course large enough and sufficiently off-centered to make bridgings by solder unlikely when reasonable care is being exercised during the wiring. Mid tab 9B' may have a like opening also, but a single necked-down constriction 24 connecting it with the junction of the two half-loops is instead shown to offer the same type of blockage.

It should be understood that the specific embodiments and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. The method of compensating a strain-gage transducer for zero-balance variations with temperature which comprises fashioning from material having a predetermined relatively high temperature coefficient of resistance a compensation unit having two foil strands of substantially equal resistance each physically exposed along one side of insulating carrier material, mounting the compensation unit in substantially the same thermal environment as the strain gages and deformable sensing portion of a transducer with the foil strands exposed and accessible for mechanical abrasion, connecting the two strands thereof separately into adjacent arms of a bridge network including the strain gages where changes in relative resistance values of the strands will change the bridge-network output, electrically exciting the bridge network from a stable source and signalling the electrical outputs from the network while the transducer is unloaded, the signalling of outputs including signallings produced by maintaining the transducer at relatively low and high temperatures and at room temperature, determining a rate of change in zero balance with temperature from the signallings of outputs at the relatively low and high temperatures and the temperature change, determining a target output signalling as the product of the rate of change in zero balance and a factor related to change in resistance of the foil strand material with temperature, and abrading at least one of the exposed foil strands while maintaining the transducer unstrained at room temperature to reduce the foil thickness and increase the resistance thereof and thereby promote the target output signalling from the network, whereby compensation is introduced for zero-balance variations with temperature thereafter.

2. The method of compensating a strain-gage transducer as set forth in claim 1 wherein the fashioning of the compensation unit includes forming the two strands with substantially half-loop flat configurations serially joined integrally atop a single substantially planar carrier member of said carrier material, and wherein the mounting of said unit includes supporting the carrier member on a part of the transducer other than the deformable sensing portion thereof and with the flat half-loop foil strands exposed outwardly for access during the abrading.

3. The method of compensating a strain-gage transducer as set forth in claim 2 wherein the fashioning of the compensation unit includes forming the half-loop flat strands from foil material selected from nickel, copper and nickel-iron alloy.

4. The method of compensating a strain-gage transducer as set forth in claim 2 further comprising fashioning a bridge-balance resistance unit substantially identical with said compensation unit but of foil material having a substantially negligible temperature coefficient of resistance, and mounting said bridge-balance unit on a part of the transducer other than the deformable sensing portion thereof and with the flat half-loop foil strands thereof exposed outwardly for access for purposes of mechanical abrasion thereof, and abrading at least one of the exposed foil strands of the bridge-balance unit while maintaining the transducer unstrained at room temperature, after the step of abrading the compensation unit, to reduce the resistance thereof and thereby promote the signalling of substantially zero output from the network.

5. The method of compensating a strain-gage transducer as set forth in claim 2 wherein the fashioning of the compensation unit includes forming the half-loop foil strands integrally with relatively broad-area wiring tabs one substantially at a junction between the two strands and two at the free ends thereof, and forming relatively narrow paths of the foil integrally connecting each of the tabs with the strands, the narrow widths of the paths promoting surface-tension effects tending to hold molten solder from the wiring tabs against flow onto the strands.

6. The method of compensating a strain-gage transducer as set forth in claim 1 wherein determining the rate of change in zero balance with temperature involves obtaining the difference between signallings of the outputs at the relatively high and low temperatures and ratioing that difference with the difference between those temperatures.

7. The method of compensating a strain-gage transducer as set forth in claim 1 wherein the factor related to change in resistance of the foil strand material with temperature is established by taking the reciprocal of the percentage change of resistance of the foil material with temperture.

8. A compensation unit for compensating a strain-gage transducer for zero-balance variations in output of its bridge network with temperature, comprising two flat foil strands of substantially equal resistance each physically exposed along one side of a flat insulating carrier for abrasion which will increase resistance thereof, said foil strands being integral with one another at a junction in a planar foil layer of material having a predetermined relatively high temperature coefficient of resistance, each of said strands being integral with a separate relatively broad-area foil wiring tab at one end and with a third relatively broad-area wiring tab at said junction, and said strands being integrally joined with said wiring tabs by constricted foil paths of narrow widths promoting surface-tension effects tending to hold molten solder from the wiring tabs against flow onto said strands.

9. A compensation unit as set forth in claim 8 wherein at least some of said constricted foil paths are each in the form of parallel paths into which material of a tab is separated by a relatively small opening through the foil of the tab at the site of its integral juncture with one of the foil strands, the foil strands being narrower than the tabs.

10. A strain-gage transducer compensated for zero-balance variations with temperature and including a plurality of strain gages bonded with an elastically-deformable portion of a transducer body and connected into the arms of an electrical bridge network, comprising a compensation unit having two flat foil strands of relatively low resistance exposed atop insulating carrier material, said foil strands being of a foil material having a predetermined relatively high temperature coefficient of resistance, means mounting said carrier material with said foil strands in the same thermal environment as said gages and deformable portion and upon a part of the transducer body other than said deformable portion, means connecting said two foil strands separately in adjacent arms of the bridge network where changes in relative resistance values of said strands are effective to change output of the bridge network, one of said foil strands being abraded and thinned in relation to the other and consequently having a resistance made unequal to that of the other and increased in relation to it, the amount by which the abrasively-thinned strand is increased in resistance being that which causes said output of the unstrained transducer to be a target value at room temperature, that target value being the product of a factor related to change in resistance of said foil material with temperature and the rate of change in zero balance of the unstrained transducer as determined from its outputs at different temperatures.

11. A strain-gage transducer compensated for zero-balance variations as set forth in claim 10, wherein said rate of change equals the difference between said outputs at relatively low and high temperatures ratioed against the difference between those temperatures, and wherein said factor equals the reciprocal of the percentage change of resistance of said foil material with temperature.

12. A strain-gage transducer as set forth in claim 11 wherein said two flat foil strands of said compensation unit are in one planar layer of said foil material and are integral with one another at a junction, said layer further including three relatively broad-area foil wiring tabs integral with said strands at said junction and at the free ends thereof, and wherein said foil material is selected from nickel, copper and nickel-iron alloy.

* * * * *